Sept. 2, 1941.  J. P. PIELER  2,254,444
MOWING APPARATUS
Filed Nov. 29, 1940   8 Sheets-Sheet 1

Inventor
John P. Pieler
By Clarence A. O'Brien
Attorney

Sept. 2, 1941.　　　J. P. PIELER　　　2,254,444
MOWING APPARATUS
Filed Nov. 29, 1940　　　8 Sheets-Sheet 8

Inventor
John P Pieler

By Clarence A O'Brien

Attorney

Patented Sept. 2, 1941

2,254,444

UNITED STATES PATENT OFFICE 2,254,444

MOWING APPARATUS

John P. Pieler, Eureka, Nev.

Application November 29, 1940, Serial No. 367,853

6 Claims. (Cl. 56—6)

This invention relates to a mowing apparatus, the general object of the invention being to provide a row of mowing machines actuated from a tractor with the row extending outwardly and rearwardly from the tractor, with a carriage at the outer end of the row and a second carriage located intermediate in the row, with means whereby the operator of the second carriage can control the operation of the mowing machines between the second carriage and the outer end of the row.

Another object of the invention is to provide a frame for connecting the tractor with the second carriage and a frame for connecting the second carriage with the outer carriage, with means for connecting the mowing machines with the frame for vertical movement of the machines.

A further object of the invention is to provide means whereby the drive wheels of the two carriages are driven from the tractor, with means whereby the operator on the intermediate carriage can control the driving of the outer carriage.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 12:
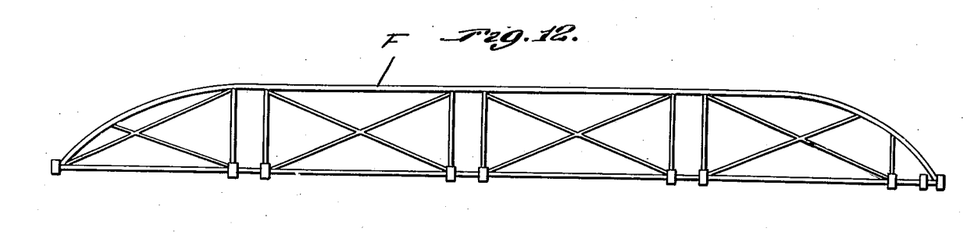
Figure 12 is an elevational view of the long frame.
Figure 13:
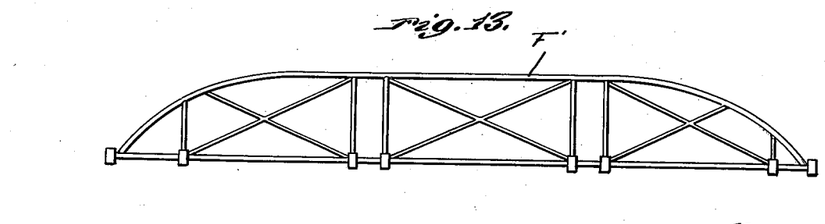
Figure 13 is a similar view of the short frame.
Figure 14:
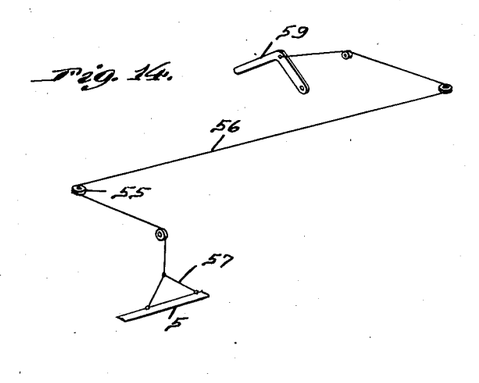
Figure 14 is a diagrammatic view showing a cable for raising one of the cutter bar assemblies.

In these drawings the letter T indicates a tractor, the letter C indicates the first or intermediate carriage and the letter C' indicates the second or end carriage. A plurality of mowing machine units M is placed between the tractor and the first carriage and similar units are placed between the two carriages and each carriage carries a mowing unit as shown. A long truss frame F, see Figure 12, extends from the tractor to the first carriage and a short truss frame F' extends between the two carriages and the frames of the units, the frames of the two carriages and a frame on the tractor are each formed with upwardly extending posts 1 which pass through eyes or sleeves 2 on the frames F and F' with stops 3 at the upper ends of the posts for preventing the posts from entirely passing through the sleeves and if desired springs 4 may be placed on the posts between the sleeves and the parts of the frames of the units, carriages and tractor. The posts and sleeves connect the parts together and permit a certain amount of vertical movement of the vehicles so that they can pass over uneven ground without resistance from the other parts of the apparatus.

Figures 1, 16:
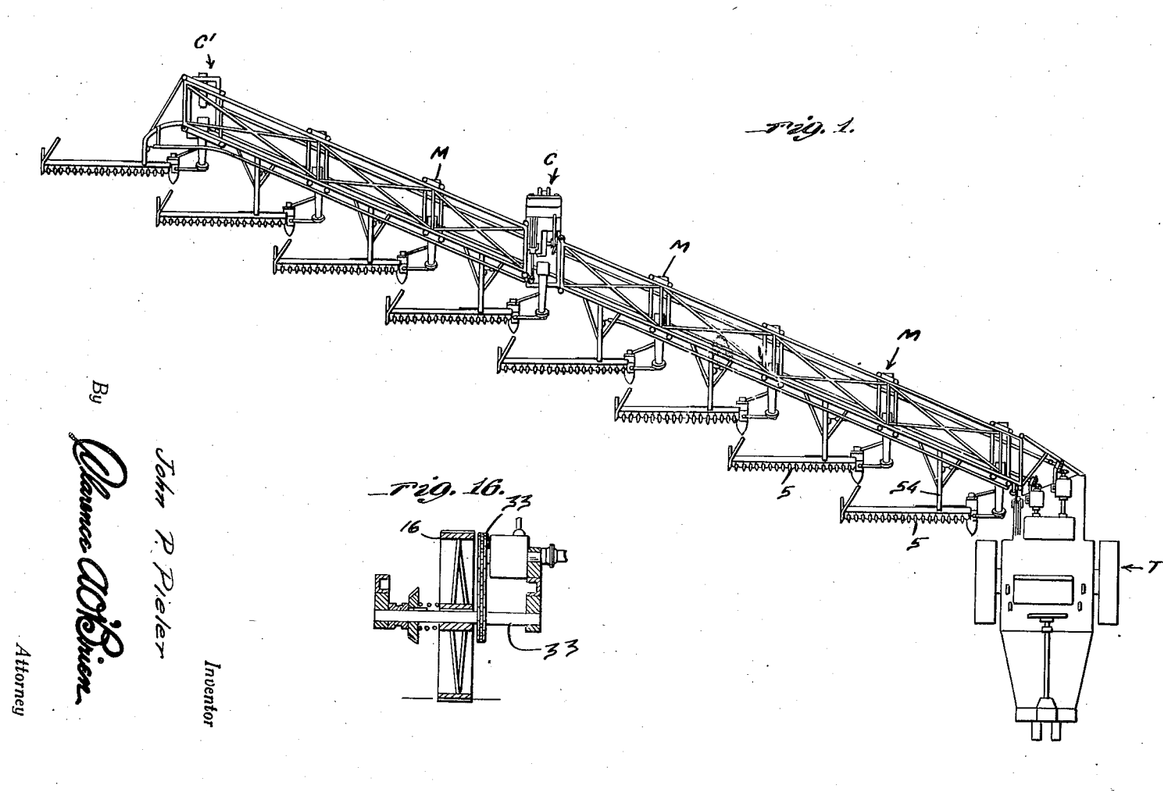
Figure 1 is a top plan view of the entire apparatus.
Figure 16 is a section on the line 16—16 of Figure 15.
Figure 2:
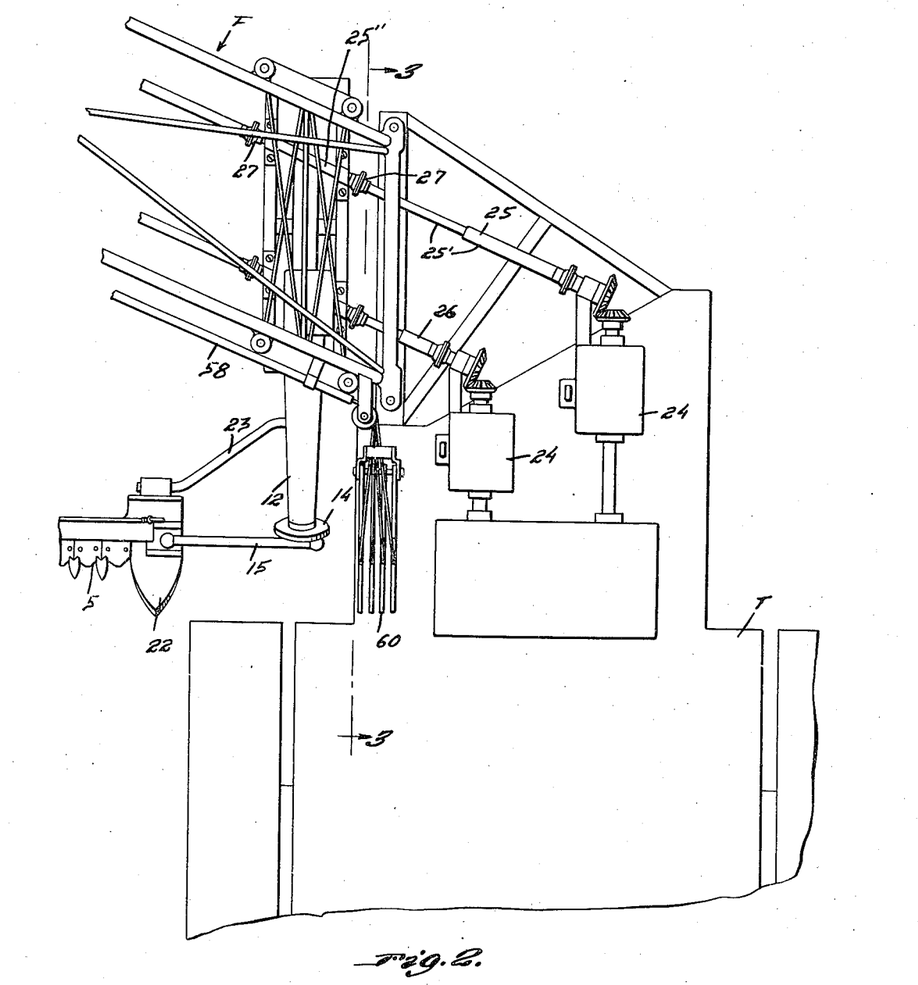
Figure 2 is a top plan view of the rear portion of the tractor and showing portions of the apparatus adjacent the tractor.
Figure 3:
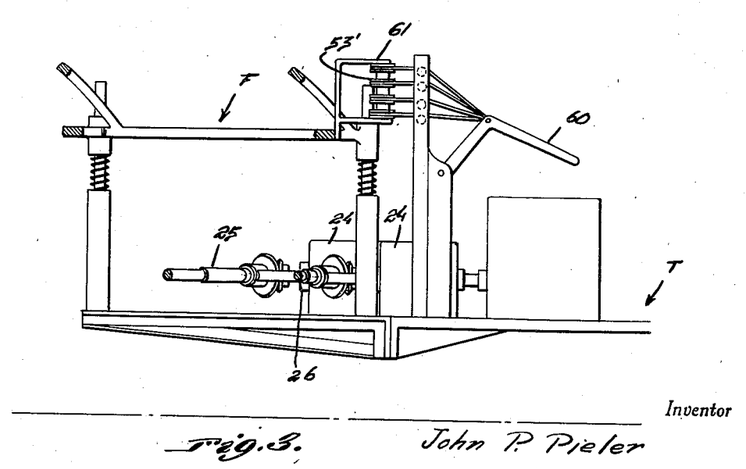
Figure 3 is a section on the line 3—3 of Figure 2.

As shown more particularly in Figure 1 the two carriages and the mowing machine units form a row which extend diagonally or outwardly and rearwardly from the rear of the tractor with the cutting units 5 overlapping so that a wide strip will be cut by the apparatus, thereby enabling a large field to be quickly cut by the apparatus. As clearly shown in Figure 1 the mowing machine units and the carriages extend parallel to each other and parallel to the longitudinal axis of the tractor so that the cutting units 5 are placed one in advance of the other.

Figure 4:
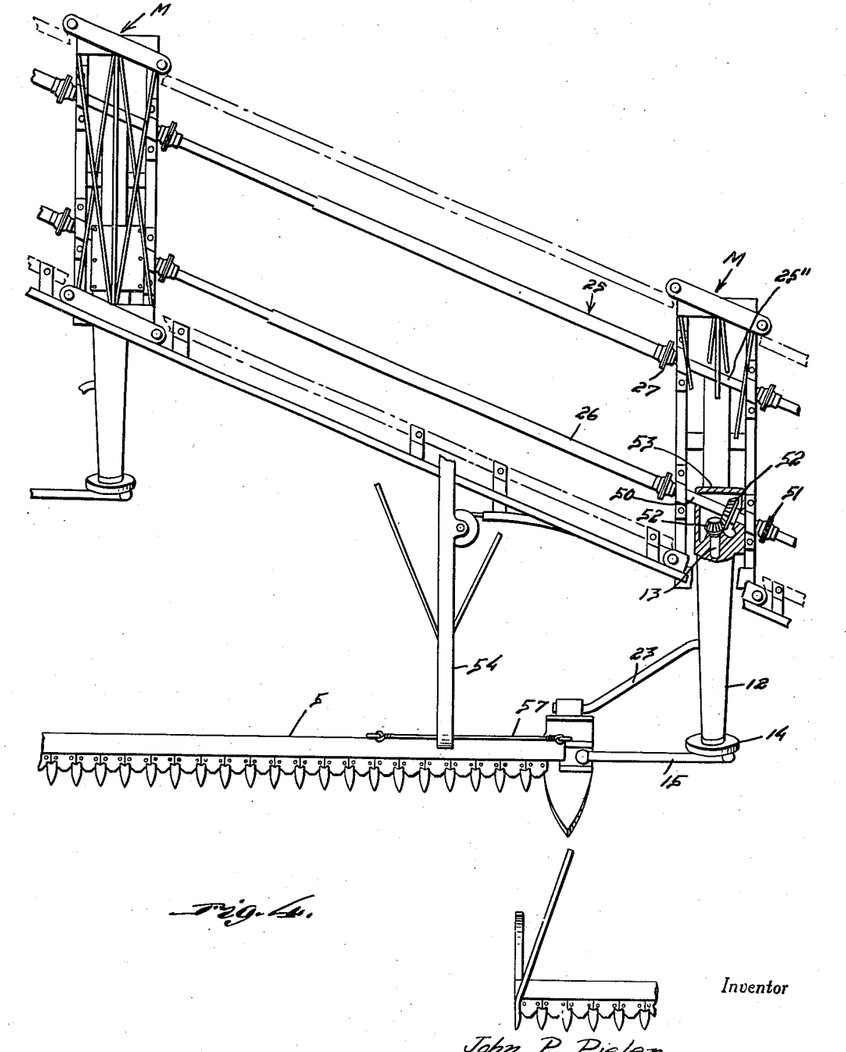
Figure 4 is a top plan view of two of the mowing machine units with parts omitted and parts in section.
Figure 5:
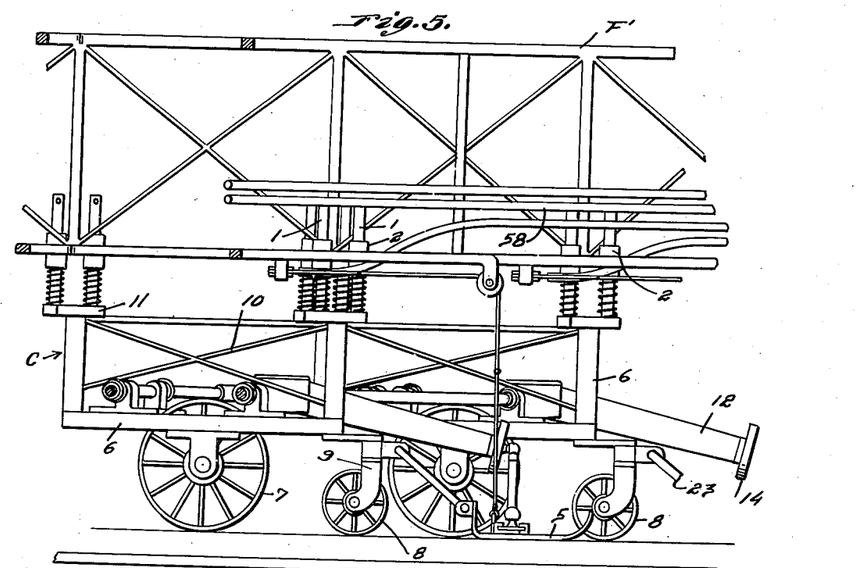
Figure 5 is a vertical sectional view through the apparatus and showing two of the mowing machine units in elevation.
Figure 6:
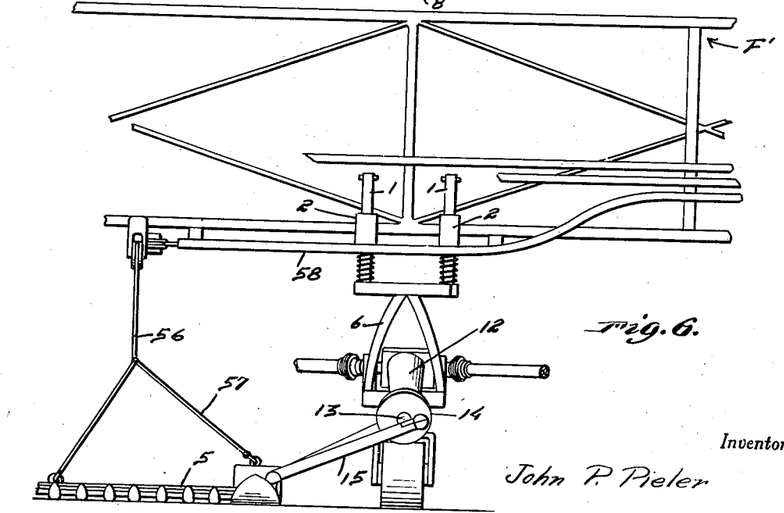
Figure 6 is a front view of one of the mowing machine units and portions of the frame.

Each mowing machine unit, as shown in Figures 4 and 5, includes a frame 6 supported by a large wheel 7 located at or adjacent to the transverse center thereof and a wide small front wheel 8 carried by a fork 9 and each frame is suitably reinforced as shown at 10 and has a pair of the posts 1 at its rear and another pair at its front, these posts being carried by the supporting pieces 11 at the top of the frame. A downwardly and forwardly sloping housing 12 extends from the front of each frame 6 and carries a rotary shaft 13 having a crank disk 14 attached to its front end to the pin of which the pitman 15 of the cutting assembly 5 is connected, these cutting assemblies being of any desired type, with the knife bar reciprocated from the pitman when the shaft 13 is rotated. The cutting assemblies on the two carriages are similarly constructed.

Figure 8:
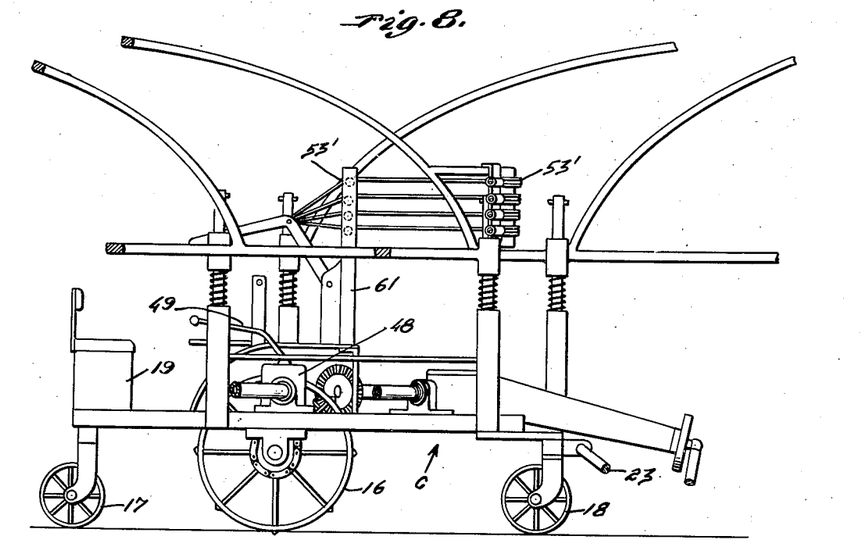
Figure 8 is a section on the line 8—8 of Figure 7.
Figures 9, 11:
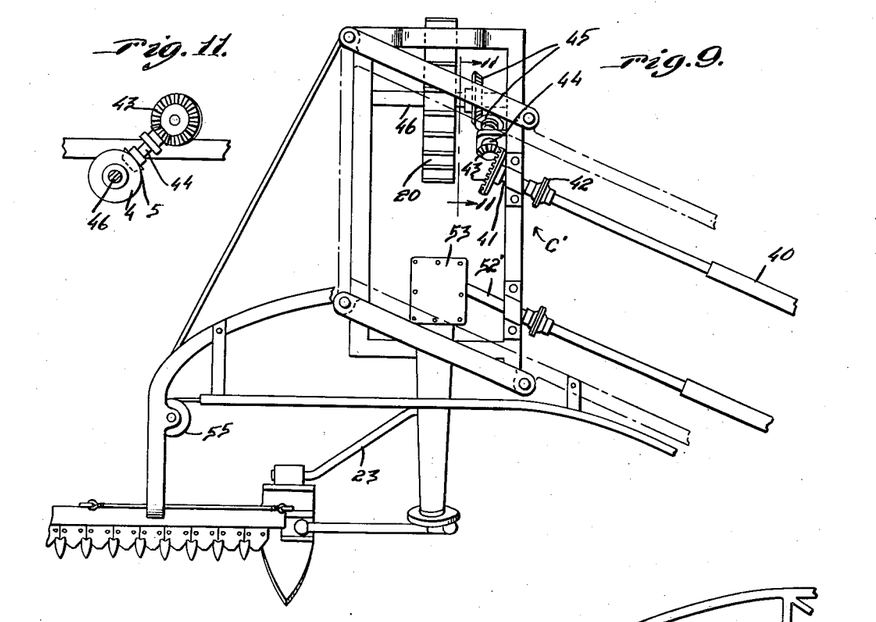
Figure 9 is a top plan view of the outer carriage.
Figure 11 is a section on the line 11—11 of Figure 9.
Figure 10:
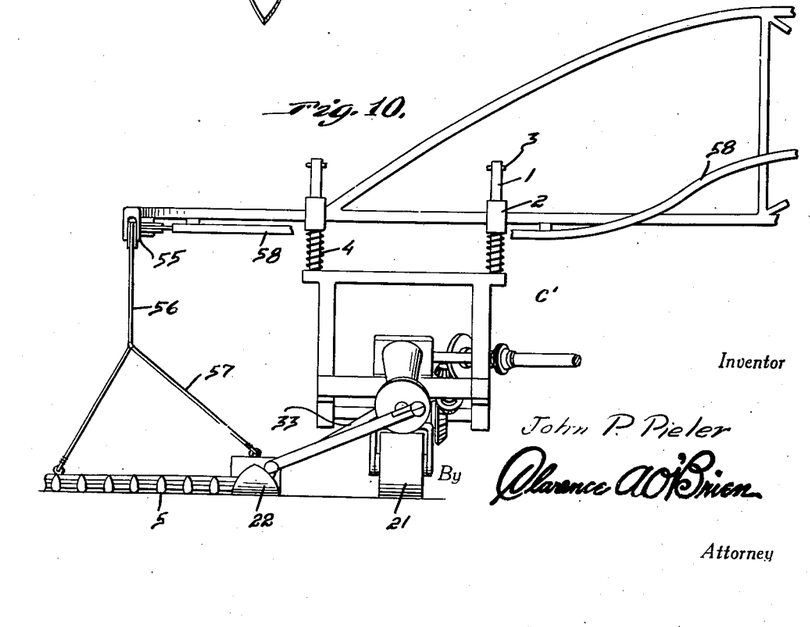
Figure 10 is a front view of the outer carriage and showing parts of the frame.

The frames for the two carriages are substantially the same as the frames of the mowing machine units though these frames are made larger and the frame of the carriage C is supported by a substantially centrally arranged ground wheel 16, a rear caster wheel assembly 17 and a front small wheel 18 as shown in Figure 8. This carriage C also carries a seat 19 for an operator, the seat being located at the rear of the carriage. The frame of the carriage C', see Figures 9 and 10, is supported by a single ground wheel 20 located adjacent the rear of the frame and a wide front wheel 21 of small diameter and in both carriages and all the moving machine units the shoe 22 at the front end of the cutting assembly 5 is connected by a brace 23 to a front part of the vehicle.

Figure 7:
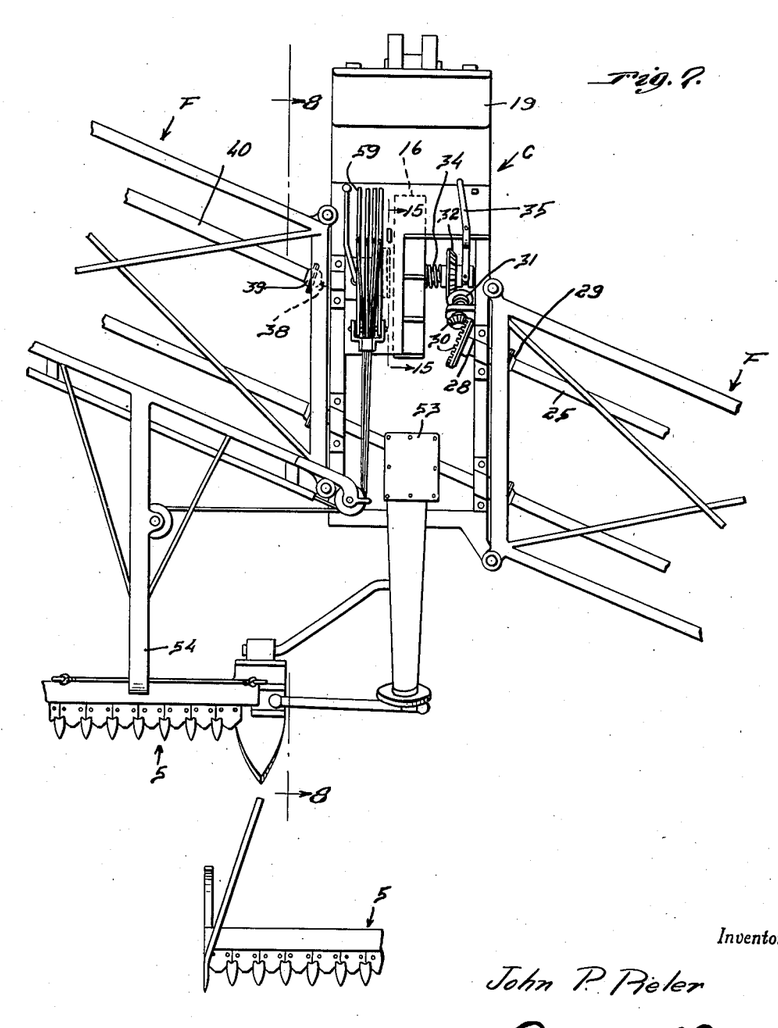
Figure 7 is a top plan view of the intermediate carriage.
Figure 15:
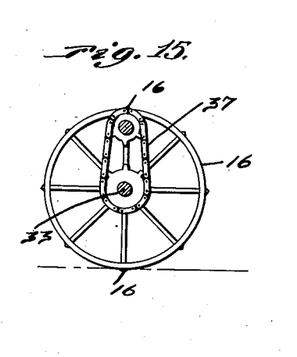
Figure 15 is a section on the line 15—15 of Figure 7.

The rear part of the tractor carries a pair of transmission means 24, one of which is geared to a shaft 25 for driving the wheels of the two carriages and the other one of which is geared to a shaft 26 for operating the cutting assemblies 5. The shaft 25 is composed of a plurality of telescopic parts 25' and a section 25" of the shaft 25 passes diagonally through each mowing machine unit and each section 25" is connected to the adjacent sections by a universal joint 27. This shaft 25 terminates at the first carriage C in a short diagonal section 28 which is connected with the adjacent section by a universal joint 29 and this section 28 is connected by the gears 30, see Figures 7 and 15, with a short shaft 31 rotatably supported in the carriage C and this short shaft 31 is connected by the gears 32 with a shaft 33 extending transversely for rotary movement in the carriage C, the gear 32 which is carried by the shaft 33 being slidably but non-rotatably supported on the shaft 33 as shown in Figure 16. The two gears are normally held in mesh by a spring 34 and a clutch lever 35 is provided for moving the gear 32 of the shaft 33 out of mesh with the gear 32 of the short shaft 31. Thus the operator on the seat 19 of the carriage C can connect the shaft 33 with a drive shaft 25 or disconnect the shaft 33 from the drive shaft whenever he desires. The shaft 33 passes through the hub of the wheel 16 of the carriage C to drive the same and chain and sprocket means shown generally at 37 drives a short shaft 38, journaled in the carriage C, from the shaft 33. A universal joint 39 connects the outer end of the short shaft 38 with a sectional shaft 40, some of the sections of which are telescopic and others of which are journaled in the mowing units between the two carriages C and C' and this shaft 40 terminates in a short section 41 which is connected to the adjacent section by a universal joint 42 and the section 41 is connected by the gears 43 to the short shaft 44 which, in turn, is connected by the gears 45 with the shaft 46 of the wheel 20 of the carriage C' as shown in Figure 9 and also in Figure 11. Thus the drive wheels 16 and 20 of the two carriages are driven from the tractor but the operator on the carriage C can disconnect the drive means from the wheels of the two carriages whenever he desires by manipulating the lever 35 and transmission means 48, controlled by a lever 49 are located on the carriage C and control the drive of the shaft 40 from the chain and sprocket means 37 through means of the shaft 38, see Figures 7 and 8.

The shaft 26 is also composed of telescopic sections and the short sections 15 which pass through the units M and the carriage C are connected to the adjacent sections by universal joints 51 and each section 50 is connected by the beveled gears 52, see Figure 4, with the pitman drive shaft 13 so that this shaft 26 drives all the cutting means, the sections 52' which extend into the carriage C' terminating in the gear box 53 of this carriage.

Forwardly extending members 54 are carried by the frame F and F' and carry pulleys 55 over which cables 56 extend and each cable terminates in a yoke 57 which is connected to a cutting assembly 5 so that by pulling upon these cables the cutting assembly can be raised and lowered, the cables passing through tubes 58 carried by the main frames F and F' to the tractor and to the carriage C. The cables for raising and lowering the cutting assemblies from the carriage C to the carriage C' lead to hand levers 59 on the carriage C and controlled by the operator on the seat 19 of this carriage, while the other cables lead to levers 60 on the tractor and controlled by an operator on the tractor. Of course, the operator on the tractor controls the transmission means 24 for the shafts 25 and 26 by suitable levers. The pulleys 53' for the cables at the tractor are carried by upright portions 61 forming part of the frame of the tractor.

It will be seen that with this apparatus a large field can be easily and quickly cut with all the parts driven from the tractor and with the operator on the tractor controlling the cutting assemblies of the units between the tractor and the first carriage and the operator on the first carriage controlling the remaining units and while all the vehicles are connected together by the truss frames F and F' the vehicles have independent movements in a vertical direction so that the apparatus can readily pass over rough ground without interfering with the operation of the apparatus and the operator on the first carriage can help the operator on the tractor to manipulate the apparatus in turning, backing, etc. The clutch and transmission means on the first carriage will enable the operator of this carriage to control the wheel of the outer carriage so that this wheel can be made to turn faster or slower than the wheel of the first carriage either in reverse or forward and the wheel of the first carriage can also be controlled in a like manner.

It is thought from the foregoing description that the advantages and novel features of the invention will be readily apparent.

The chains and other movable parts, where necessary or desirable, are enclosed by removable housings and protect such parts from dirt and dust and other foreign matter, and as will be seen the parts are so arranged and connected together as to eliminate side draft and a vertical and flexible movement of the different units permits the invention to cut close to the ground, especially on an uneven ground such as is to be found on large ranches and farms.

It is to be understood that changes may be made in the construction and in the combination and arrangement of the several parts provided that such changes fall within the scope of the appended claims.

Having described the invention, what is claimed as new is:

1. In a mowing apparatus of the class described, a tractor, a pair of carriages, mowing machine units located between the tractor and one carriage, mowing machine units located between the first carriage and the last carriage, each carriage having a ground engaging wheel, shafting driven from the tractor for driving the wheels of the carriages, clutch and transmission means on the first carriage, actuated by an operator on the first carriage, for controlling the transmission of power from the tractor to the carriages, a cutter bar assembly on each unit and on each carriage, shafting actuated from the tractor for operating the cutting units, means actuated from the first carriage for raising and lowering the cutting assemblies of the two carriages and of the units between the carriages and means actuated from the tractor for raising and lowering the cutting assemblies of the units between the tractor and the first carriage, and means for connecting the carriages and the units to the tractor.

2. In a mowing apparatus of the class described, a tractor, first and second carriages, mowing machine units between the first carriage and the tractor, mowing machine units between the two carriages, a frame extending from the tractor to the first carriage, a second frame extending from the first carriage to the second carriage, means for connecting all the vehicles to the frames for limited vertical movement independently of each other, a cutting assembly for each mowing machine unit and each carriage, means actuated from the tractor for operating all the cutting assemblies and means for driving the wheels of the carriages from the tractor.

3. In a mowing apparatus of the class described, a tractor, first and second carriages, mowing machine units between the first carriage and the tractor, mowing machine units between the two carriages, a frame extending from the tractor to the first carriage, a second frame extending from the first carriage to the second carriage, means for connecting all the vehicles to the frames for limited vertical movement independently of each other, a cutting assembly for each mowing machine unit and each carriage, means actuated from the tractor for operating all the cutting assemblies and means for driving the wheels of the carriages from the tractor, the last-mentioned means including shafting including telescopic sections and universal joints and differential and clutch means on the first carriage for controlling the drive of the wheels of the two carriages.

4. In a mowing apparatus of the class described, a tractor, first and second carriages, mowing machine units between the tractor and the first carriage and between the two carriages, cutting assemblies for each of the units and the two carriages, means for driving all the cutting assemblies from the tractor, such means including shafting comprising universal joints and telescopic sections, a section being carried by each unit and each carriage with universal joints connecting said sections, a truss frame extendng from the tractor to the first carriage, a second truss frame extendng from the first carriage to the second carriage, posts carried by all the vehicles and said frames having sleeves for slidingly receiving the posts, and means for driving the wheels of the carriages from the tractor.

5. In a mowing apparatus of the class described, a tractor, first and second carriages, mowing machine units between the tractor and the first carriage and between the two carriages, cutting assemblies for each of the units and the two carriages, means for driving all the cutting assemblies from the tractor, such means including shafting comprising universal joints and telescopic sections, a section being carried by each unit and each carriage with universal joints connecting said sections, a truss frame extending from the tractor to the first carriage, a second truss frame extending from the first carriage to the second carriage, posts carried by all the vehicles and said frames having sleeves for slidingly receiving the posts, and means for driving the wheels of the carriages from the tractor, said means including differential and clutch means on the first carriage for controlling the drive of the wheels of the two carriages from the tractor.

6. In a mowing machine apparatus of the class described, a tractor, first and second carriages each provided with a drive wheel, mowing machine units placed between the tractor and the first carriage and between the first carriage and the second carriage and each unit and each carriage having a cutting assembly, means for raising and lowering the cutting assembly of the carriages and of the units between them from the first carriage, means for raising and lowering the cutting assembly of the units between the tractor and the first carriage from the tractor, means for driving the wheels and the carriages from the tractor, such means including telescopic shaft sections and universal joints, some of the sections being rotatably supported by the units and the carriages and universal joints connecting these sections with adjacent sections, clutch and differential means on the first carriage for controlling the drive of the wheels of the two carriages from the tractor, a seat on the first carriage, a truss frame extending from the tractor to the first carriage, a second truss frame extending from the first carriage to the second carriage, means for connecting all the vehicles to the frames for vertical movement.

JOHN P. PIELER.